March 16, 1965  F. D. PARKER  3,173,330
REAR PROJECTION VIEWER
Filed Nov. 2, 1962  2 Sheets-Sheet 1
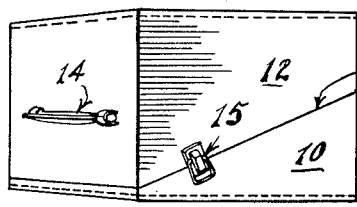
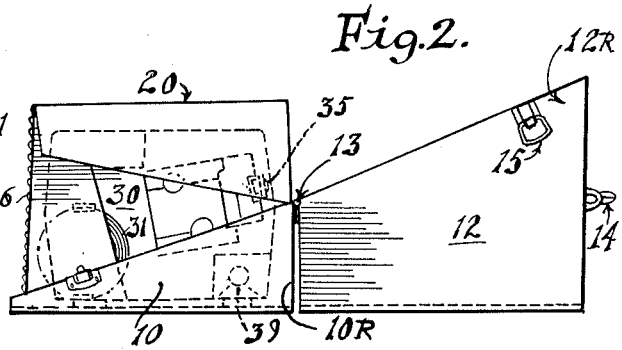
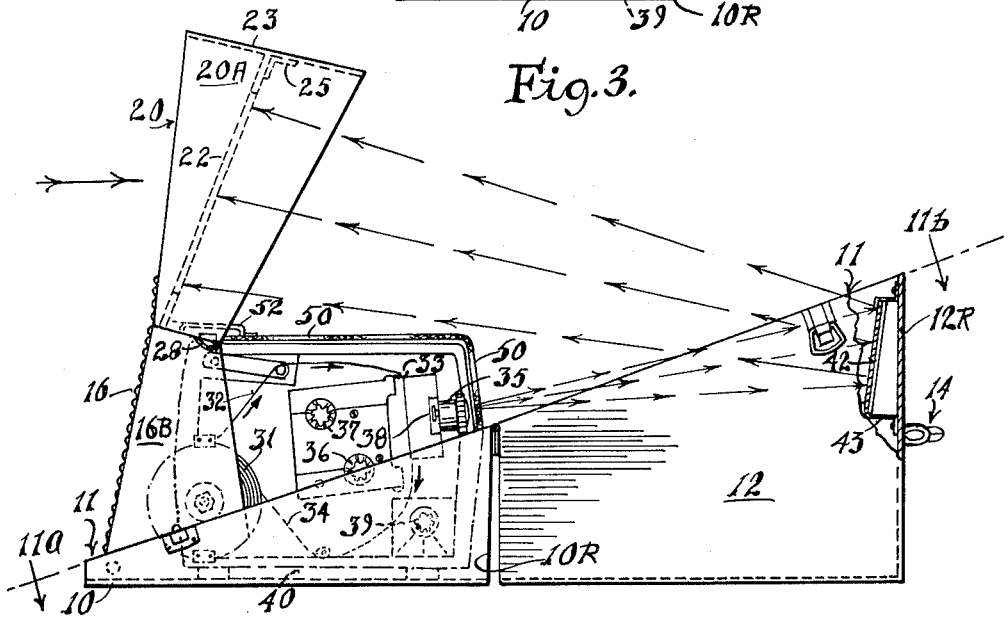
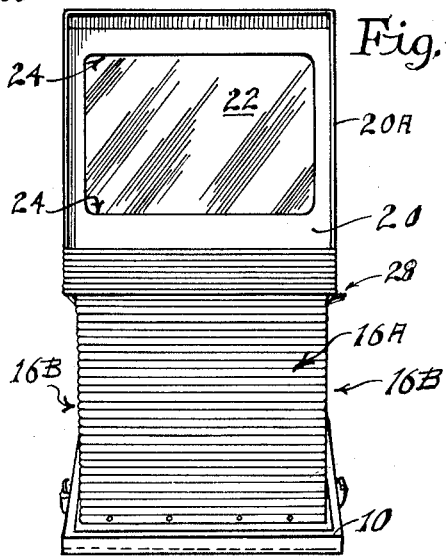
INVENTOR.
FLOYD D. PARKER
BY
ATTORNEY.

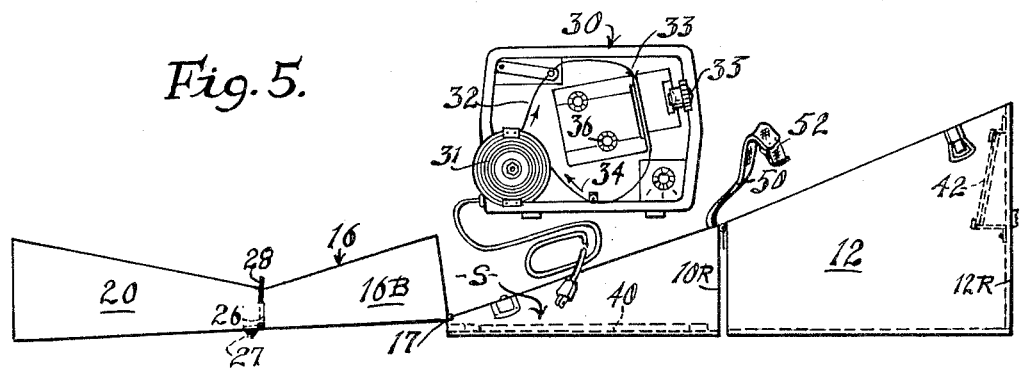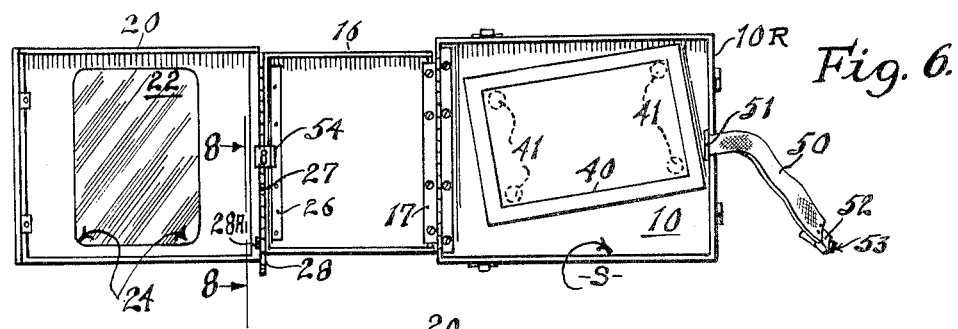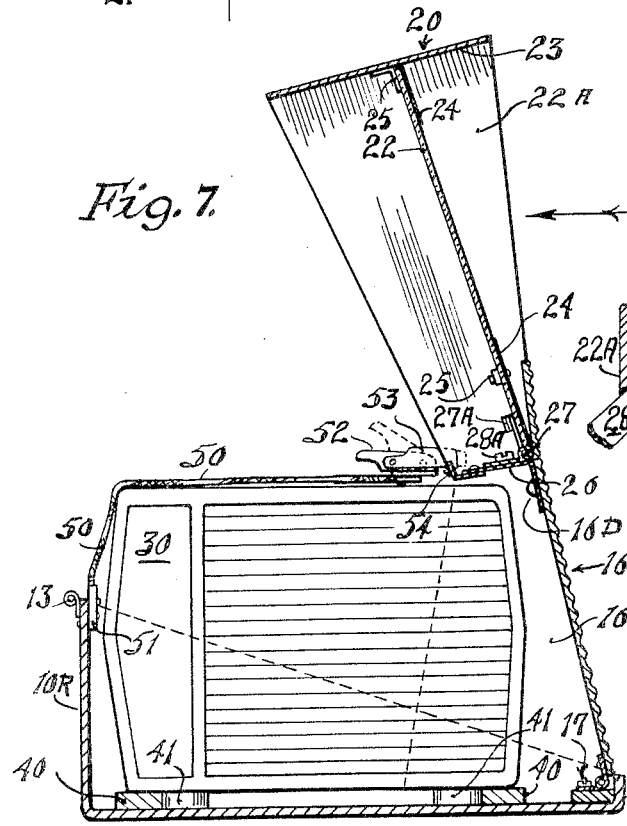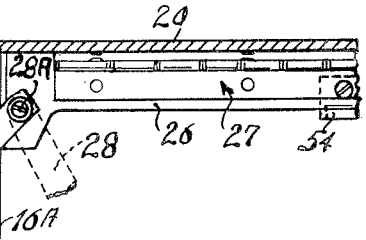
INVENTOR.
FLOYD D. PARKER
BY
ATTORNEY.

United States Patent Office 3,173,330
Patented Mar. 16, 1965

3,173,330
REAR PROJECTION VIEWER
Floyd D. Parker, Wilmette, Ill., assignor to McClure Projectors, Inc., Evanston, Ill., a corporation of Illinois
Filed Nov. 2, 1962, Ser. No. 234,981
10 Claims. (Cl. 88—24)

This invention has as its principal object the provision of a highly compact portable motion picture projection and viewing apparatus particularly, but not exclusively, adapted for table viewing in connection with sales presentations, educational and conference presentations, and the like, requiring a minimum of projection and viewing space and equipment which is portable and quickly readied for use.

The disclosed projector is of the rear-projection type which focuses the picture images on the back of a translucent screen adapted to be viewed from the front thereof, one of the important features of the novel device residing in the construction and operation of a simplified, foldable, combination viewing screen and hood which is adapted to fold down into partial stowing interfit with the projector.

Another feature resides in the provision of a quick-release hold down means for securing the projector removably in an orienting well or base and at the same time securing a pedestal portion of the viewing screen structure in operative position.

Still another feature pertains to the construction and form of normally-articulated, but optionally separable, top and bottom casing members respectively supporting the projector and screen components and a reprojection mirror, and having mutually diagonally alignable wall portions arranged to provide an optical path for projection of the picture rays when the casing members are joined for rear projection table viewing and adapted to expose the projecting lens system for direct-screen viewing when the casing members are separated.

Additional objects and aspects of novelty and utility relate to details of the construction and operation of the embodiment of the projector described hereinafter in view of the accompanying drawings in which:

FIG. 1 is a perspective view of the projector case in closed condition;

FIG. 2 is a side elevation of the projector case opened to operative position, but with the viewing screen folded down;

FIG. 3 is a side elevation of the projector in fully operative condition;

FIG. 4 is a front view of the projector showing the viewing screen and hood;

FIG. 5 is a partially exploded side view of the projector;

FIG. 6 is a top plan view of the projector in the condition shown in FIG. 5; with cover section absent;

FIG. 7 is a vertical section through the viewing screen structure and the appertaining part of the case showing the projector in elevation;

FIG. 8 is a fragmentary sectional detail to enlarged scale viewing the lock lever along lines 8—8 of FIG. 6.

The novel projection apparatus, and more particularly the carrying case portably housing the same, is depicted in closed condition in FIG. 1, it being noted that the expression "projector" is used both in a general sense to designate the apparatus in its entirety, and accordingly comprising the picture projecting unit, the viewing means, and the carrying case, and certain rear-projection appendages carried thereby, on the one hand; or the film projector itself, on the other hand, the context making the intended meaning clear.

The carrying case comprises a lower base section 10 and an upper lid or top section 12 detachably hinged to the base section (FIG. 2) by means of separable hinge members 13 of known type, the walls of the two sections being formed to meet along a diagonal parting line 11 (FIG. 1) with the opposite diagonal margins of the respective sidewalls of the two casing sections normally lying in a straight line 11a–11b, as illustrated in FIG. 3, when the case is opened and said sections remain in hingedly articulated relation. A carrying handle 14 is provided on the front wall of the top section, and snap clasps 15 secure these members in their closed relation to define the rectangular carrying case depicted in FIG. 1.

Foldable to fit within the closed case (FIG. 2) is a combination hood and viewing screen structure consisting of a relatively fixed lower pedestal section 16, and an upper screen and hood section 20 hingedly joined to the pedestal section so that the upper part can pivot down into the stowing position shown in FIG. 2, in which it overlies and fits partially about upper parts of a picture projector 30, the upper section being erectable to the upstanding inclination and viewing position portrayed in FIG. 3, in which condition the picture projector 30 is substantially fully exposed for operational access.

As viewed in FIGS. 3 and 5, the projector 30 is a self-contained, electrically-powered motion picture projector preferably accepting standard 8 millimeter film and usually equipped with an endless film carried on a single reel 31 of the known type which pays out from the inside of the roll and takes up on the outside thereof, the outfeeding web 32 (FIG. 5) looping into the film gate 33 at the top thereof, and the returning web 34 emerging from the bottom of the gate for take up on the outside of the reel 31 in the known manner.

The bottom section 10 of the casing is dimensioned so that its rear wall 10R lies below the intended rearward projection axis of the lens system 35, which is preferably of the type having the usual vertical framing adjustment means controlled by a knob 36, the usual elevating or levelling mechanism actuated by a control knob 37 for moving the picture up or down on the screen, a focusing lever 38, and a power control switch 39, the optical adjustments being desirable in order that fullest advantage may be taken of one of the features of the device, namely, the optional use of the projector 30 for the directly-projected, large-screen pictures in addition to the special rear-projection viewing which the disclosed improvements are particularly intended to afford.

The film projecting unit 30 is disposed removably in the bottom case section 10 in a predetermined position of angular orientation relative to the adjoining side walls by positioning means in the form of a shallow well defined by a frame 40 (FIG. 3) adapted to surround the projector feet 41 closely so that the latter on seating therein are constrained to stand in the dotted-line positions shown in FIG. 6, by reason of which a space —S— is provided between the side of the projector on which the adjustment controls 36–39 are disposed, and the confronting side wall whereby to facilitate manipulation of said controls and also to afford a stowage space for the power cord.

Rear projection is achieved by means of a small mirror 42 (FIG. 3) secured on the high backwall of the lid by cleat means 43 at such an angle in respect to the optical axis of the projecting lens system 35 as to redirect and bring to focus the image-forming rays onto the rearward surface of a translucent viewing screen 22, tilted at a convenient angle within the upper hood section 20, to facilitate viewing of the pictures in the direction of the fletched arrow (FIG. 3) from a sitting or standing position in reasonably close proximity to the usual table top.

It will be observed in FIG. 3 that the rear wall 12R of the cover section of the carrying case is substantially elevated above the upper edge of the corresponding wall 10R in the bottom section whereby to position the redirecting mirror so that the reflected image rays wholly clear the top of the picture projector 30 for resolution on the viewing screen, further advantage being taken of this sloping arrangement in making the hinges 13 for the two casing sections of the separable variety so that the cover member may be wholly separated from its attachment to the bottom section, as in FIGS. 6 and 7, thus making it possible to quickly eliminate the mirror and utilize the projector 30 for projection to a larger, more distant screen of the direct-viewing variety without removal of the projector from the case or manipulation of the rear-projection screen.

The combination folding screen and hood means comprises a lower pedestal section 16 preferably formed as an aluminum stamping, and consisting, as viewed in FIGS. 4, 5, and 6, of a front wall 16A which may be ornamentally decorated with ribbing or the like, and having opposite side walls 16B of trapezoidal shape, this section of the structure being hingedly attached to the base of the case (FIG. 6) by means of a hinge 17 secured to the latter close to the low front edge thereof so that it can be rocked back into the normal upright position depicted in FIGS. 4 and 7, or laid down into a horizontal plane, as in FIG. 5, for purposes to appear.

The upper section 20 of the screen and hood structure is a stamping shaped similarly to the bottom section in the respect that it has two oposite trapezoidally-shaped side walls 20A (FIGS. 4, 5, and 6) and these walls are joined at their wider upper margins to a top wall 23 (FIG. 7 also) to form a shadow box or hood which is recessive at both the rear and front thereof with respect to the viewing screen set therein and comprising preferably a substantially rigid panel of suitably translucent plastic sheeting secured thereto by means such as angle brackets 25 spot welded or otherwise affixed to the hood walls. This translucent panel is provided on its forward face with a masked area 24 of opaque paint or the like surrounding a viewing or screen area 22 having the rearward appearance seen in FIG. 6, and the forward or front-viewing apearance seen in FIG. 4, the rearward face being suitably roughened or treated in the manner of ground glass to provide the usual image-resolving surface on which the projected picture can be brought to focus.

Means pivotally attaching the upper or screen section to the lower section comprises (FIGS. 6 and 7) an angle bracket 26 secured along the upper margin of the lower section, as at 16D, and affording a shelf or ledge to which is attached one wing of a long hinge 27, the other wing of which is attached as at 27A across the foot of the screen hood so that the latter can pivot down upon the projector into the stowing position shown in FIG. 2.

In order to secure the screen section in upright viewing position when it is erected, there is provided screen locking means in the form of a simple lever 28, pivoted at 28A (FIGS. 7 and 8) on the shelf bracket 26 near one of the screen hood side walls 22A, there being sufficient overtravel of the screen section in moving into erected viewing position to permit pivoting this lever 28 beneath the lower edge of said side wall so that the latter, and hence the upper screen section, is prevented from dropping.

As previously alluded to in view of FIGS. 5 and 6, the film projector 30 is removably seated in its positioning frame 40 in the case bottom, this being effected by a releasable hold-down means in the form of a flexible web strap 50, secured by a cleat 51 at its fixed end to the rear wall 10R of the bottom section, and provided at its other end with a quick-release buckle means in the form of a lever-clasp 52 including a latching lever having a hook 53 adapted to catch into a companion keeper member or cleat 54 affixed to the shelf bracket 26 on the lower screen section in the manner depicted in FIG. 7. By this means, the pedestal section of the hood is firmly secured in upright position, and at the same time the hold-down strap is under tension along its length to bear down upon the top of the projector 30 to secure the latter in its bedding frame 40. However, if it should be desired to remove the projector, the hold-down strap may be easily and quickly released by pulling up on the clasp lever 52 to trip out the latching lever and clasp, whereupon the projector may be lifted from the base, as in FIG. 5; and when the strap is disconnected from the latch keeper in this manner, the entire hood structure may also be pivoted outwardly of the base to lie in the condition seen in FIGS. 5 and 6 and facilitate access to the rear face of the screen and the bottom of the case for cleaning, etc.

While the projector 30 will generally be a motion-picture projector, a slide or still-picture projector having a lens system disposable at the necessary rear-projection angle, and dimensions suitable for interfitting cooperation with the screen hood, orienting frame, and hold down means, may be substituted where needed.

I claim:

1. A portable picture projecting and viewing apparatus comprising a carrying case having a bottom section and a top section and means detachably hinging one to the other such that in conjoined condition both members are articulated to open and rest upon a table surface or the like with respectively designated rear walls of each lying in substantially parallel planes and the rear wall of the top section having portions exposed at an elevation substantially above the upper margin of the rear wall of the bottom section; a picture projector positioned in the bottom section and having projection lens means situated at an elevation such that its optical axis will be aligned with said exposed rear wall portions of the top section for passage of image rays thereto; means carried on said exposed rear wall portions of the top for redirecting the image rays in a direction back toward the projector but at an elevation to clear the top of the latter; and translucent viewing screen means carried by said bottom section adjacent that part of the projector which is most remote from said rear wall sections and in the path of said redirected image rays coming to focus on the side thereof proximate to the projector to afford a resolving surface on which the projected picture images can be resolved for viewing from the side of the screen means remote from the projector.

2. In a rear-projection motion picture apparatus, in combination, a substantially rectangular casing comprising a bottom section and a top section hingedly joined thereto, said sections being shaped to separate along a diagonal parting line such that the bottom section has a back wall of predetermined height and the top section turns into open relation to the bottom section with a front wall not greater in height than the back wall of the bottom member and said front wall stands in substantially parallel and proximate relation with the back wall of the bottom section in said open condition, and said back wall of the top section stands at a substantially higher lever than, and approximately parallel to, said back wall of the bottom section in said open condition, a reflecting device carried at a predetermined reflecting angle on the inside of said back wall of the top section at a level above the back wall of the bottom section and facing in the general direction of the latter; and a picture projector disposed in said bottom section and having projection lens means in optical alignment with said reflecting device and adapted to project picture-forming rays onto the latter for redirection therefrom to come to image-forming focus at a predetermined location above the top of said projector; and a translucent viewing screen disposed with a focal plane on one side thereof in said location so that the picture image can be viewed therethrough on the opposite side thereof.

3. In a picture projecting apparatus, a base member, a projector seated on said base member, and a folding screen and hood structure comprising a pedestal section having a rearwardly recessed portion, and means along the bottom of said portion pivotally mounting the same on said base member for movement from a substantially horizontally-extending plane projecting beyond the base member and approximately paralleling the plane of the base member to an upright operative inclination tilting back over the base member close to one end wall of the projector, and an upper screen section including a picture screen disposed between opposite hood side walls joined by a top wall extending across the upper margin of the screen such that the screen is recessed on both front and rearward sides within an enclosure defined by said top and side walls, means for releasably securing said upper section in a pivotally-erected condition in approximate alignment with the inclination of the pedestal section in a direction to partially overlie the top of the projector and such that on release the upper section can pivot downwardly upon the projector with upper portions of the latter fitting into the rearwardly recessed part of the hood.

4. The construction of claim 3 further characterized by the provision of strap means having connection at one end with said base member and an attaching means at an opposite end operable for attaching engagement under tension with means on said pedestal section in a position closely overlying and bearing down upon the top of the projector and exerting an effort resultant from such tension upon the pedestal section tending to pivot the same in a direction toward the projector, and means on said pedestal section limiting the pivotal movement of the same in said last-mentioned direction to maintain the pedestal section in said inclined operative position.

5. Picture projecting apparatus comprising a carrying case having articulated, relatively movable top and bottom sections respectively adapted in an open condition of the case to rest upon a tabling surface, said top section having an upright wall portion which is most remote from other wall portions of both the bottom and top sections, in said open condition, of a dimension to rise above the level of said other wall portions; a picture projector positioned on said bottom section with a projection lens means aimed at said upright wall portion; reflecting means on said upright wall portion redirecting projected picture rays back toward said projector at a level above the top of the latter; a foldable translucent rear-projection type of viewing screen carried in proximity to the projector at that side thereof which is most remote from said lens and reflecting means in the direction of the redirected rays in said open condition of the case, and further arranged and constructed to be movable from a folded-down stowing condition close to the projector to an upstanding viewing condition with a first side of said translucent screen in the path of said redirected rays for resolution of picture images thereon so that such images may be viewed from the opposite second side of the screen most remote from said reflecting means, said top section in closed condition with the bottom of the case enclosing all parts of the projector and stowed screen.

6. Apparatus according to claim 5 further characterized in that said screen is contained within a hood structure having recessed portions which nest at least partially down upon upper portions of said projector in said stowing condition.

7. Apparatus according to claim 5 further characterized in that said top section of the case is attached to said bottom section by separable hinge means permitting complete separation of the top section to expose said projection lens means for normal projection upon a wall or other front-viewing screen surface in alignment with the lens means.

8. Apparatus according to claim 5 further characterized in that said bottom section includes a positioning means adapted to cooperate with bottom portions of said projector to constrain the latter in a predetermined condition of orientation relative to said reflecting means, together with further means for releasably securing the projector in cooperative relationship with said positioning means.

9. Apparatus as set forth in claim 8 further characterized in that said viewing screen comprises at least two relatively movable sections, a first one of which is a bottom pedestal structure having pivotal attachment to the bottom section of the case to move from a reclining position outwardly of the bottom section to an upright attitude above the bottom section, said screen structure including a second and upper section comprising said translucent screen pivotally connected with the first section to fold from said stowing condition upon the projector to said upright viewing condition; latch means for releasably securing the second section in said viewing condition; and means releasably engaging with said projector and said first screen section for securing the projector in operative relationship with said positioning means and also releasably securing said first screen section in said upright viewing condition.

10. Picture projection apparatus comprising a carrying case including hingedly articulated top and bottom sections having a substantially rectangular configuration in closed condition and relatively movable to an open condition such that the top section can be turned down to rest upon a supporting surface coplanar with the surface upon which the bottom section is supported, each said section including a horizontal wall portion having adjoining front, side and rear wall portions upstanding therefrom, said sections having diagonal parting and meeting margins along their respective side walls at such an angle that when the sections are in the open condition aforesaid the front wall portion of the bottom section is the lowest, and the rear wall of the top section stands turned back into substantially parallel juxtaposition with the rear wall of the bottom section, and the front wall portion of the top section has uppermost portions in said open condition which stand at an elevation substantially above the upper margins of all other wall portions including particularly those of said juxtaposed wall portions; a projector seated in said bottom portion and having a projection axis aimed at said uppermost wall portions and clearing the upper margins of said juxtaposed wall portions; means carried on said uppermost wall portions in alignment with said axis for reflecting image forming rays from the projection at an elevation still higher than that of said axis; and means movable from a stowing position within said case in closed condition to an elevation above said projector in alignment with the reflected rays for resolving the reflected image rays for viewing purposes.

References Cited by the Examiner

UNITED STATES PATENTS

| | | | |
|---|---|---|---|
| 1,803,572 | 5/31 | Von Madaler | 88—16.2 |
| 2,361,398 | 10/44 | Harris | 88—24 |
| 2,607,649 | 8/52 | Johnson | 88—24 |
| 2,847,902 | 8/58 | D'Incerti | 88—24 |

NORTON ANSHER, *Primary Examiner.*

JOHN M. HORAN, *Examiner.*

UNITED STATES PATENT OFFICE
CERTIFICATE OF CORRECTION

Patent No. 3,173,330 March 16, 1965

Floyd D. Parker

It is hereby certified that error appears in the above numbered patent requiring correction and that the said Letters Patent should read as corrected below.

Column 3, line 31, for "oposite" read -- opposite --; column 4, line 59, for "lever" read -- level --.

Signed and sealed this 22nd day of February 1966.

(SEAL)
Attest:

ERNEST W. SWIDER
Attesting Officer

EDWARD J. BRENNER
Commissioner of Patents